United States Patent [19]

Stapleton

[11] Patent Number: 4,812,285
[45] Date of Patent: Mar. 14, 1989

[54] INSTRUMENTATION PORT CLAMPS AND CLAMPING SYSTEMS

[75] Inventor: Cecil R. Stapleton, Pensacola, Fla.

[73] Assignee: Westinghouse Electric Corp., Pittsburgh, Pa.

[21] Appl. No.: 58,952

[22] Filed: Jun. 5, 1987

Related U.S. Application Data

[63] Continuation-in-part of Ser. No. 925,863, Oct. 30, 1986.

[51] Int. Cl.⁴ ............................................. G21C 13/00
[52] U.S. Cl. .................................. 376/203; 285/302; 285/339; 285/367; 285/411; 285/421
[58] Field of Search ............... 376/203, 272, 463, 302, 376/339, 364, 365; 285/366, 367, 406, 407, 410, 411, 421

[56] References Cited

U.S. PATENT DOCUMENTS

| | | | |
|---|---|---|---|
| 565,698 | 8/1896 | Sparks | 285/421 |
| 1,200,798 | 10/1916 | Bennett | 285/339 |
| 1,692,798 | 11/1928 | Potter | 285/421 |
| 2,775,806 | 1/1957 | Love | 285/411 |
| 3,797,078 | 3/1974 | LaPointe | 285/367 |

FOREIGN PATENT DOCUMENTS

3305526 9/1984 Fed. Rep. of Germany ...... 376/203

Primary Examiner—Deborah L. Kyle
Assistant Examiner—Richard Klein

[57] ABSTRACT

Clamps and clamping systems for sealing the interface between two generally tubular conduits are disclosed. The clamps of the present invention are especially well adapted for use in nuclear reactor systems, especially as clamps for the instrument port interfaces of nuclear reactors. The clamps are generally comprised of articulated members pivotally joined by link plates such that the clamp may be opened in jaw like fashion so as to allow easy assembly around the conduits to be sealed. The conduit seal assembly includes an upper positioner which has a frusto-conically shaped surface and a male flange with a frusto-conically shaped upper surface. These two surfaces create an annular wedge-like opening for accepting a wedge-shaped upper clamp. The upper articulated clamp when assembled thus provides the proper clamping force between the conduit seal and male flange.

18 Claims, 6 Drawing Sheets

FIG. 1.

(PRIOR ART)

INSTRUMENTATION PORT CLAMPS AND CLAMPING SYSTEMS

RELATED APPLICATIONS

This application is a continuation in part of copending application Ser. No. 925,863, filed Oct. 30, 1986, which is assigned to the assignee of the present application and which is incorporated herein by reference.

This application is related by subject matter to copending application Ser. No. 925,861, filed Oct. 30, 1986, which is assigned to the assignee of the present invention and which is incorporated herein by reference.

BACKGROUND OF THE INVENTION

This invention relates to systems for sealing the instrumentation ports associated with nuclear reactor systems. More particularly, the present invention relates to high quality clamps and systems for maintaining a proper seal at the interface between reactor vessel head penetrations and the thermocouple instrument columns.

Due to the risks associated with operating a nuclear power plant, the design and quality standards associated with nuclear reactor equipment are extremely high and stringent. Accordingly, problems which are capable of straight forward solution in a non nuclear environment are difficult and demanding in the context of a nuclear reactor facility. For example, it is generally required in many industrial settings to monitor the pressure, temperature, and other parameters of various operating equipment. In the environment of a nuclear power plant, leaks are extremely dangerous due to the high potential for escape of radioactive materials into the containment building. Accordingly, it is imperative in these situations that the instrumentation used to make such measurements be precisely designed to prevent such leaks.

While the possible escape of radioactive material from a nuclear power plant is minimized by the containment building surrounding the nuclear steam supply system, the working conditions inside the containment building are hazardous at all times after the fuel is activated. This is even true during refueling of the reactor high airborne particulate radioactivity exisss in the containment building. Safety regulations set maximum radiation dose limits for workers in these locations during plant operation and refueling. Many of these same locations also impose a difficult working environment during refueling due to the high ambient temperatures inside the containment building. In many situations, these locations are also not easily accessible and a safe work platform is not available. It is accordingly desirable to provide clamping system which are quickly and easily assembled so as to minimize worker exposure to such hazardous conditions. Such quick and efficient repair and/or replacement of instrument port clamps and clamping systems is also highly desirable from the economic point of view since it minimizes the down time of the nuclear plant and hence the cost of providing replacement electricity. In particular, the instrument port assemblies must be disassembled before the reactor vessel head can be removed and then reassembled after refueling is complete and the vessel head is installed.

Figure 1:
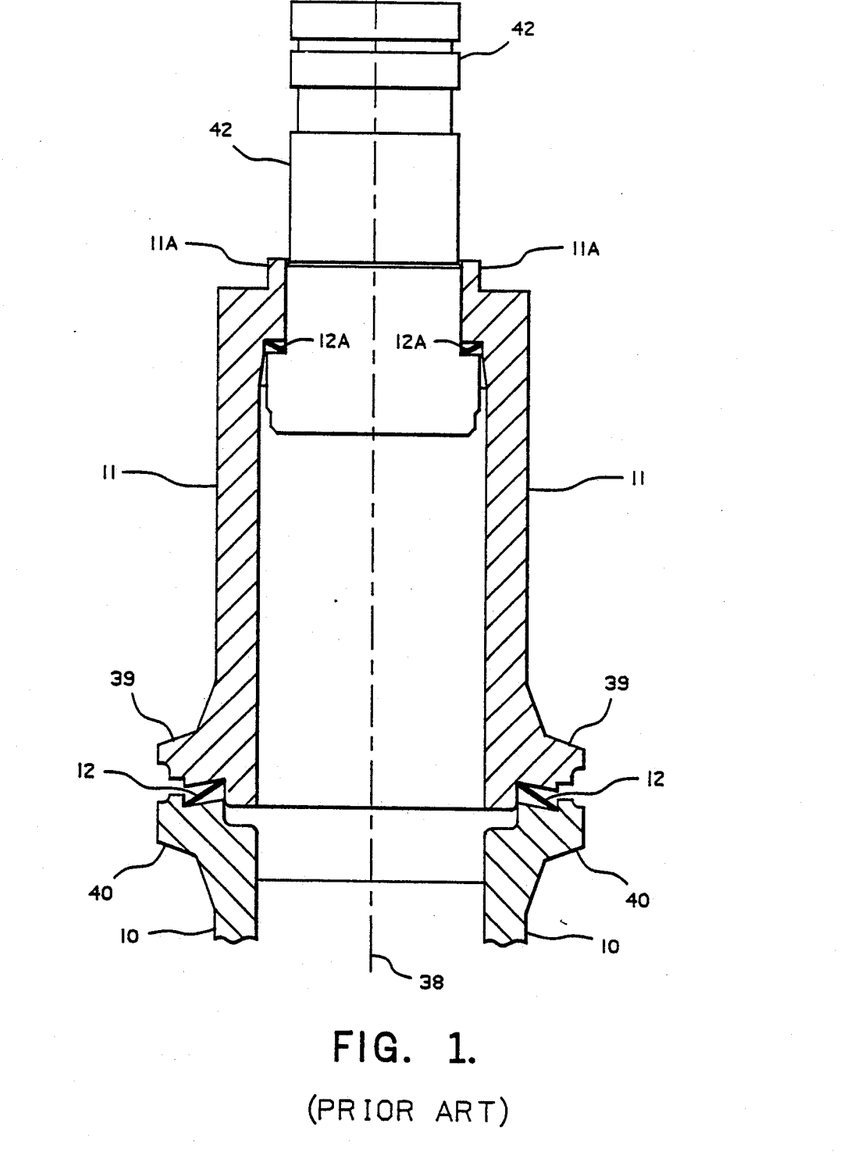
FIG. 1 is a schematic view of a typical prior art instrument port interface assembly.

In order to more clearly understand the present invention, a typical heretofore used instrumentation port interface assembly is revealed in FIG. 1. As revealed by this illustration, a lower conduit or flange 10 is coupled or otherwise mounted to a vessel while the upper conduit or flange 11 is coupled or otherwise mounted to flange 10 and assembly 42. In the particular application of a nuclear power plant, flange 10 is the female flange having its lower end threaded and welded onto the vessel head penetration. The flange 11 is the male flange, and assembly 42 is the conduit seal which houses the thermocouples which pass into the interior of the male flange and down into the reactor internals. Flanges 10 and 11 are generally tubular in shape and have upper and lower surfaces respectively which are designed to engage one another in a sealing manner with respect to gasket 12. The conduit seal 42 is also generally tubular and cooperates with the male flange 11 in a telescoping manner to seal the interface therebetween. A gasket 12A engages both the male flange and the conduit seal 42 at the interface therebetween. In order to effectively compress gasket 12 and seal the interface between flanges 10 and 11, it is necessary to exert axial pressure on flanges 10 and 11 such that pressure exerted on each flange is directed towards the interfacing end of that flange. That is, a clamping apparatus should exert an upward axial force on flange 10 while exerting a substantially equal and opposite downward force on flange 11. In this way, the interface between flanges 10 and 11 is properly sealed by gasket 12. In contrast, the interface between male flange 11 and assembly 42 requires application of axial pressure to each flange which is directed away from the interfacing ends thereof. That is, it is necessary for a clamping apparatus to exert an upward axial pressure on conduit seal 42 with respect to the male flange 11. In this way, the interface between the male flange 11 and the conduit seal 42 is properly sealed by gasket 12A.

The seal between flanges 10, 11, and 42 is an important safety consideration in the design of nuclear steam supply systems. It will be appreciated by those skilled in the art that such flange interfaces are generally located in regions of the plant having a high radioactivity level and high process temperatures. Because of these special circumstances, high quality clamps capable of sealing the interface between flanges are not only desirable but necessary. In some applications, it is desirable to construct such clamps from high strength material. In addition, it is highly critical to worker safety that the clamping apparatus used to seal such interfaces be quickly and easily installed and removed.

Figure 2:
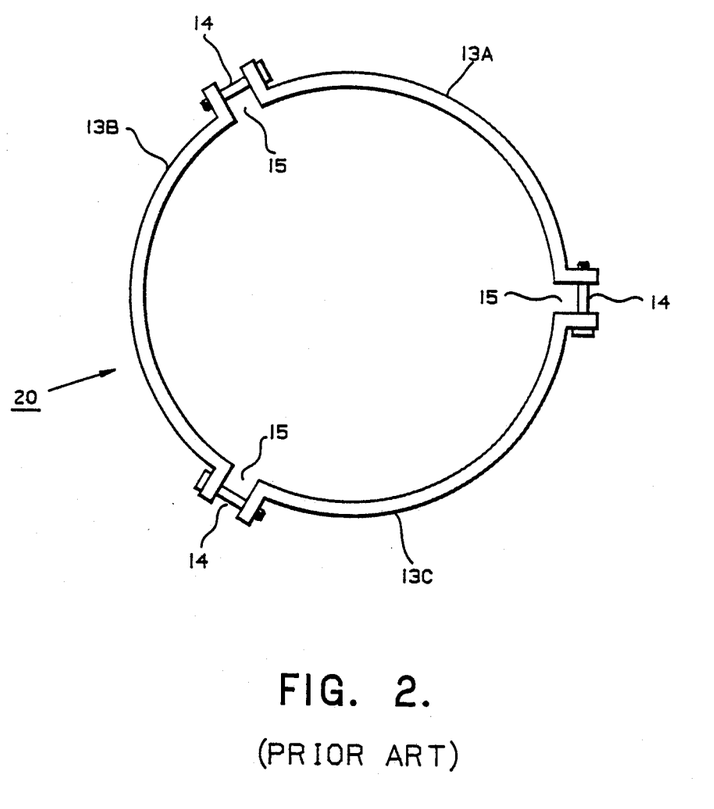
FIG. 2 is a plan view of a prior art clamp apparatus.

One clamping apparatus generally designated as 20, which has heretofore been used to seal the interface between the female flange 10 and the male flange 11 is shown in FIG. 2. The clamping apparatus 20 consists of three essentially identical body members 13A, 13B, and 13C. Each body member spans an arc of approximately 110°. An interbody gap 15 of about 10° exists between the body members. Each end of the body members 13A, 13B and 13C contains a flanged portion which is used to attach the body members together. A cap screw 14 (as shown) or other holding means is passed through the flanged ends and holds the body members in a generally ring-shape while the clamp is assembled on flanges 10 and 11.

The use of the existing clamp 20 on the interface between the male flange and female flange as shown in FIG. 1 will now be described. Due to its configuration and weight, the clamp 20 of FIG. 2 is generally brought to the instrument port in disassembled form. At least two workers are then generally required to assembly clamp 20 in situ around the outer portion of the interface between flanges 10 and 11. Workmen only have access to flanges 10 and 11 from radially outside the reactor vessel head because of the cooling shroud and other equipment permanently installed thereabove. The specified procedure for operation of the heretofore used clamping apparatus requires the use of an axial loading device which seats the gasket prior to the application of the clamp. Such axial loading devices are generally cumbersome, heavy and tend to interfere with the vessel head shroud, making the installation thereof extremely difficult. The application of this axial loading device also restricts the work space available and therefore complicates the assembly of clamp 20. Once the axial loading device is properly positioned, the interbody gaps 15 must be carefully adjusted so as to be substantially equivalent in order to achieve generally uniform contact and pressure on the flanges 10 and 11, and to minimize cap screw shank bending. The cap screws 14 are generally torqued to about 100 ft-lb or less. It should be noted that, in many applications, over torquing of the cap screws 14 may result in overcompression of gasket 12 when certain gasket configurations are used. For many gaskets, overcompression has a serious detrimental impact on the sealing capacity of the gasket. Some prior art clamping apparatus generally used space limiters between the flanges in order to prevent such overcompression of the gasket. It is apparent from the above description that the procedures and apparatus required for the assembly of clamp 20 and other prior clamping devices are thus time consuming and present a large potential for improper installation. The above disadvantages are even more pronounced when it is considered that such a clamp must be installed in awkward and precarious positions requiring workers to be tethered by ropes and/or other safety gear and that workers are required to wear cumbersome gear such as masks, heavy gloves, and radiation suits with respirators.

The apparatus which have generally been heretofore used to seal male flange 11 and the conduit seal 42 incorporates the use of six separate jack screws. Each jack screw must be separately torqued in stages to provide the necessary axial clamping force around the entire perimeter of the assembly 42 and male flange 11. The jack screws are disposed circumferentially around the perimeter of the conduit seal 42 and male flange 11 through a ring called a jack screw plate. The jack screw plate is in contact with a protruding portion of a split ring which is disposed within annular recess 43 formed in the conduit seal 42. The lower end of each jack screw is in contact with shoulder 11A which is formed in the top of male flange 11. The threads of each jack screw cooperate with threads formed in circumferentially spaced holes formed in the jack screw plate. Axial loads developed by torquing the jacks are transmitted to the groove in the conduit seal 42 by way of the splitting. To provide the necessary sealing force between the conduit seal 42 and the male flange 11, the jack screws are torqued, thereby causing the conduit seal to lift relative to the male flange. Thus, the base of the jack screws apply a downward force to the male flange 11 while the jack screw plate applies an equal and oppositely directed force to the split ring, which, in turn, is transmitted to the conduit seal 42.

Several disadvantages are attendant with the use of the jack screw system described above. For example, each jack screw may be turned, individually, only a few turns before adjacent jack screws must then be torqued in order to minimize cocking of the conduit seal. Therefore, the remaining five jack screws must each, individually, be turned a small number of turns to move the jack screw plate evenly. The process must be repeated several times until the jack screws and the jack screw plate apply the necessary uniform force between the conduit seal 42 and the male flange 11. This a cumbersome and time consuming procedure, especially in the hazardous environment of nuclear power plants. Moreover, over torquing or improper advancement of the jack screws may cause one or more of the jack screws to be bent. This in turn necessitates replacement of the jack screws and, if the threads of the jack screw plate have also been damaged, then the entire jack screw plate may require replacement. Another potential disadvantage of the jack screw system is the criticality of the torquing requirements on each jack screw. That is, if the jack screws are not torqued evenly, an unequal sealing force will occur around the port column and male flange perimeter which may possibly compromise the effectiveness of the seal therebetween. Furthermore, after the jack screw assembly is completed, lock wire must be properly supplied to prevent the jack screws from becoming loose during plant operation.

SUMMARY OF THE INVENTION

It is an object of the present invention to provide clamps and clamping systems for use in nuclear reactor and nuclear power plant environments, said clamps and systems providing quick, safe, and easy installation in such environments.

It is a further object of the present invention to provide clamps and clamping system which apply uniform circumferential clamping pressure without the aid of axial loading devices or cumbersome jack screw systems.

It is another object of the present invention to provide clamps and clamping systems which minimize the amount of time workers are exposed to hazardous working environments, and to minimize the number of workers so exposed.

It is a still further object of the present invention to provide clamping systems which are installed and removed by application of relatively low torque without the need for special tools.

According to one embodiment of the present invention, the above and other objects are satisfied by a clamp comprising: a plurality of intermediate body members pivotally joined together to form an intermediate body portion having two ends; two end body members, each of said end body members having an unflanged end pivotally attached to one end of said intermediate body portion and an flanged end; and means for joining the flanged ends.

An instrument port clamp according to another embodiment of the present invention comprises: two end body members, each of said body members having a first end and a second end; means for linking said first ends; and means for releasably joining said second ends, the spacing between said second ends being adjustable when said joining means is released.

Another embodiment provides clamping systems for sealing the interface between two generally tubular bodies comprising each of said tubular bodies having a clamp receiving portion thereof. The clamp receiving portion of at least one said tubular bodies includes an exterior frusto-conically shaped surface which slopes away from the distal end of the first tubular body as the surface radius increases. At least one generally ring shaped clamp is provided in engagement with the clamp receiving portion of the tubular bodies. It is preferred that the clamp comprise two end body members, each of which have a first and a second end. The clamp contains means for linking the first end of the body members such that the spacing between the second ends is adjustable. The clamp further includes means for releasably joining the second ends of the body members such that adjustment of the spacing between the second ends causes an adjustment of the axial pressure on the tubular bodies.

BRIEF DESCRIPTION OF THE DRAWINGS

FIG. 6b is a cross sectional view taken along line 6b—6b in FIG. 6a.

FIG. 7b is a cross sectional view taken along the line 7b—7b of FIG. 7a.

DETAILED DESCRIPTION

Figure 3:
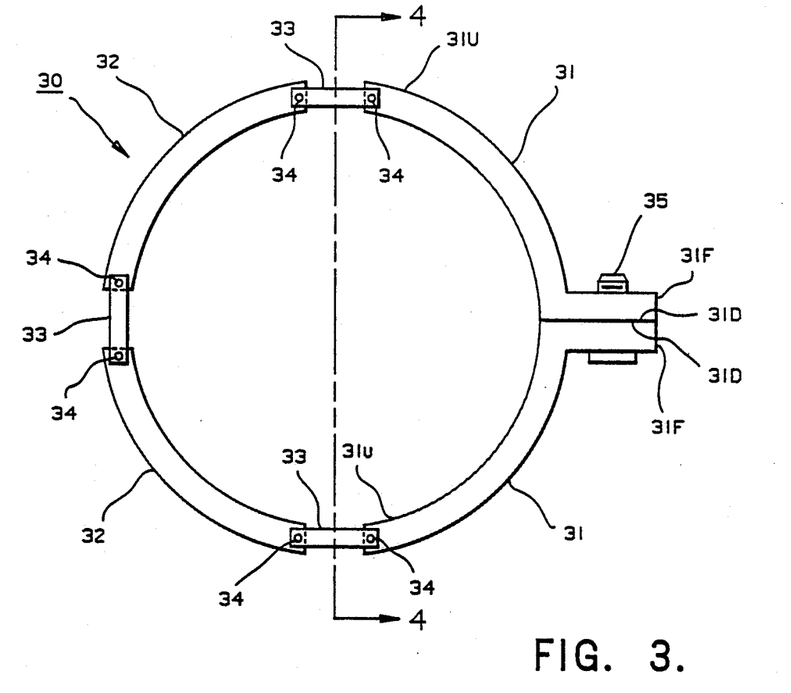
FIG. 3 is a plan view of the clamping apparatus according to one embodiment of this invention.
Figure 4:
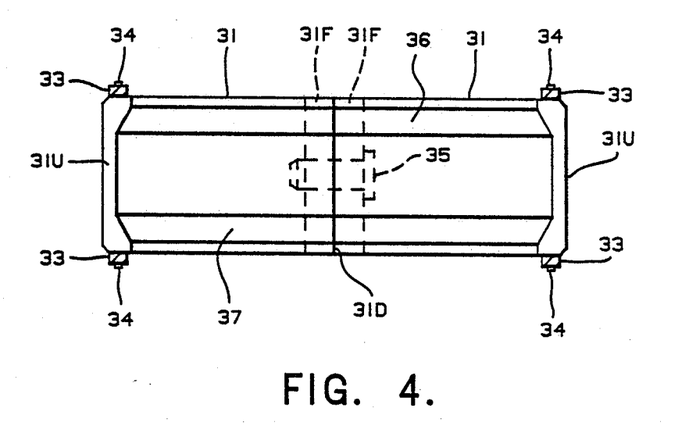
FIG. 4 is a cross sectional view taken along line 4—4 of FIG. 3.

Referring now to FIGS. 3 and 4, one embodiment of the clamping apparatus of the present invention is shown in plan and cross sectional views respectively. The clamping apparatus, generally designated as 30, comprises two end body members 31. Each of the end body members has an unflanged end 31U and a flanged end 31F. In the closed or assembled position, the flanged ends 31F are held together by cap screw 35. In one embodiment, one of the flanged ends 31F contains an unthreaded cap screw aperture therein while the other flanged end 31F contains a threaded cap screw aperture therein. The unflanged ends 31U of the end body members 31F are connected in such a manner so as to allow the circumferential spacing between the flanged ends 31F to be adjustable during assembly and disassembly. In this way, the present invention provides a unitary clamp having an adjustable end which is adapted to be opened in a jaw like fashion. During the assembly procedure, this feature allows the clamp, which is assembled except for the insertion of the cap screw, to be moved to an open position in which the clamp is easily placed into position over flanges 10 and 11.

In one embodiment of the present invention, the means for linking the end body members so as to permit the spacing between the flanged ends of the clamp to be adjustable comprises intermediate body members 32. Means, such as link plates 33, are provided for pivotally joining the intermediate body members 32 to one another and to the unflanged ends 31U of the end body members 31. Bosses 34 extend substantially axially from each end of the intermediate body members 32 and from the unflanged ends 31U of the end body members 31. Each boss extends into an aperture in link plate 33 in known fashion. In this embodiment, each boss 34 has a holding means, such as a cotter pin for example, for holding the link plates on the bosses. The body members are joined by a pair of link plates 33 as shown in FIG. 4.

It will be appreciated by those skilled in the art that means other than those described in detail above are available for linking the unflanged ends of said end body members. For example, it may be preferable in some applications to provide more than two intermediate body members. In other applications, it may be desirable to extend the arcuate span of the end body members and link the unflanged ends 31U directly together by a link plate.

The operation of an apparatus according to one embodiment of the present invention may be usefully illustrated by describing the use of the clamping apparatus shown in FIGS. 3 and 4 in connection with the male-/female flange interface shown in FIG. 1. Due in part to the articulated nature of the clamping apparatus of the present invention, the clamp may be assembled around the flange interface with a minimum of effort. With cap screw 35 removed from the clamping apparatus 30, the flanged ends 31F of the clamp are easily separated in jaw like fashion. In particular, due to the provision of at least two pivotally joined body members 31, the flanged ends 31F are easily separated a sufficient distance to allow passage of the clamp 30 around flanges 10 and 11. The flanged ends 31F are then easily rejoined by cap screw 35.

As revealed by FIGS. 3 and 4, the clamp 30 according to one embodiment of the present invention is generally ring-shape when in assembled form, the inner portion of said ring-shape clamp being adapted to engage the outer portions of flanges 10 and 11. As mentioned above, it is desirable for the clamping apparatus of the present invention to exert the proper axial seating pressure on the flange interface. As best revealed in FIGS. 1 and 4, this is achieved by providing the inwardly facing portions of clamp 30 with generally conical surfaces 36 and 37 which are non-perpendicular with respect to the axis 38 of the flanges 10 and 11 and which thus create a frusto-conical toroidal opening. In assembled form, the surfaces 36 and 37 of clamp 30 are generally compatible and parallel with respect to surfaces 39 and 40 of flanges 10 and 11 respectively. During assembly, the internal diameter of clamp 30 tends to decrease until cap screw 35 draws flanged ends 31F together. This reduction in the internal diameter of clamp 30 in turn tends to cause opposed axial pressure on flanges 10 and 11 as a result of the engagement of surface 36 with surface 39 and surface 37 with surface 40. In order to provide the most precise application of axial pressure, the inwardly facing portions of the clamp 30 are preferably machined, cast, and/or forged to precisely engage the surfaces 39 and 40 of flanges 11 and 10. More particularly, the spacial relationship between the surfaces 36 and 37 of clamp 30 and surfaces 39 and 40 is controlled so that the proper axial pressure is exerted when the flanged ends 31F are in contact.

As mentioned above, it is critical for instrument port interface clamps of the type disclosed herein to achieve and maintain the proper uniform contact and pressure on the interface. Such uniform contact and pressure will insure a properly seated gasket 12 and will prevent gasket overcompression. In addition, this uniform contact and pressure will aid in the maintenance of a proper seal during emergency conditions. These objectives are achieved, in part, by providing a datum surface on the flanged ends 31F of the end body members. According to one aspect of the present invention, the clamp 30, for example, is machined, cast, and/or forged according to methods well known in the art to exert the proper contact and pressure upon the interface between flanges 10 and 11 when datum surfaces 31D are in contact. By "preloading" the clamp 30 of this embodiment in this manner, the time required to position and assemble the clamp 30 on the instrument port interface is minimized and the need for a space limiter is eliminated. That is, once the clamp is placed around the flanges in the manner described above, the proper clamp geometry will be achieved when the cap screw is torqued sufficiently to cause intimate contact between the datum surfaces of the flanged ends. This will properly seat and compress the gasket. Further torquing of the cap screw will not overcompress the gasket and is a means for preloading the clamp flanges so that the gasket will remain seated when the pressure within the flanges increases. In particular, the clamp of the present invention will achieve these objectives upon the application of a low torque to the cap screw. In a preferred embodiment, the datum surfaces are simply the flat surfaces 31D of the flanged ends 31F. It will be appreciated by those skilled in the art, however, that the use of any particular configuration or shape of datum surface is within the scope of the present invention. For example, it may be desirable to provide datum surfaces with mating portions which provide axial alignment of the flanged ends 31F.

Gasket 12 is properly seated by clamping apparatus of the present invention without the need for the heretofore used axial loading device. This advantage is achieved, in part, by providing body members 31 and 32 with an arcuate span which is substantially less than the arcuate span of the body members 13A, 13B, and 13C according to heretofore used clamping apparatus. It is preferred that the body members according to the present invention span an arc of less than about 90°. Applicant has found that such a reduction in arcuate span and a decrease in the clamp inner radius increases the contact area between the clamp 30 and the flanges 10 and 11. This increased contact aids in the seating of gasket 12 as the clamp 30 is assembled without the use of an axial loading device. Providing a clamp according to the present invention eliminates the requirement of an axial loading device and hence simplifies the assembly procedure thereof and reduces the exposure of workers to potentially hazardous conditions.

Referring now to FIGS. 5 through 7b, a preferred clamping system according to the present invention is disclosed. With particular regard to FIG. 5, clamping and sealing systems of the present invention incorporate a modified upper portion of the male flange 11. As will be recalled from the description above, obtaining a proper seal between male flange 11 and conduit seal 42 requires application of axial pressure which is directed away from the interfacing end of each flange. That is, it is necessary for the clamping systems of the present invention to exert an upward axial pressure on cylindrical conduit 42 with respect to male flange 11. According to a preferred embodiment of the present invention, the upper end of male flange 11 cooperatively engages the system of clamps comprising positioner clamp 50 and wedge clamp 60. With regard to positioner 50, the term clamp is used for convenience but is not intended to indicate that positioner 50 actually provides a clamping function. In particular, positioner clamp 50 does not clamp any two members together, but rather provides a surface adapted for engagement with clamp 60. Although positioner clamp 50 may have any appropriate plan view construction, it is preferred that positioner 50 be comprised of two flanged members, each having an internal arcuate span of about 180, which are bolted together at the flanges using a bolt and lock nut arrangement. Clamp 60 and clamp 70 also preferably have an articulated construction of the type generally shown in FIG. 3. However, it is even more preferable for the upper clamp 60 and the lower clamp 70 to have the particular articulated constructions shown in FIGS. 6a and 6b, and 7a and 7b respectively. That is, in the more preferred clamping systems of the present invention, wedge clamp 60 and lower clamp 70 will not utilize the datum surfaces of the clamps described in the previous embodiment. Rather, it is preferred that clamps 60 and 70 have the construction more completely defined below. Moreover, in the more preferred embodiments of the present invention, hollow conical frustrum gaskets 12 and 12A as shown in FIG. 1 are used in place of the ring shape gaskets 12B and 12C shown in FIG. 5. The construction and operation of such hollow conical frustrum gaskets are well known to those skilled in the art.

Many existing conduit seals 42 contain an annular groove 43 designed for use with the jack screw system described above and shown in FIG. 1. In order to facilitate replacement, the positioner 50 utilizes annular groove 43 in conduit seal 42 according to the preferred clamping and sealing systems of the present invention. In particular, the positioner clamp 50 contains inwardly extending flange 51 at least a portion of which engages groove 43. Positioner clamp 50 also contains a lower surface 52 which is nonperpendicular with respect to the central axis 44 of flanges 11 and 42. More particularly, surface 52 is an frusto-conically shaped surface which slopes towards male flange 11 as surface radius decreases. In this way, the axial distance between any portion of surface 52 and the end of flange 11 and conduit seal 42 is functionally related to the radial distance of that portion from axis 44. The upper end of male flange 11 contains an annular surface 45 which is also generally nonperpendicular with respect to axis 44. More particularly, surface 45 is a frusto-conically shaped surface which slopes toward the end of male flange 11 as surface radius decreases. That is, the distance between surface 45 and the interfacing end of conduit 42 increases with decreasing surface radius. As the term is used herein, the end of a flange or a conduit refers to the furthest axial extent of the flange. For example, the end of male flange 11 refers to the innermost radius of surface 45 while the end of conduit seal 42 refers to the lowest portion of the conduit.

Figure 5:
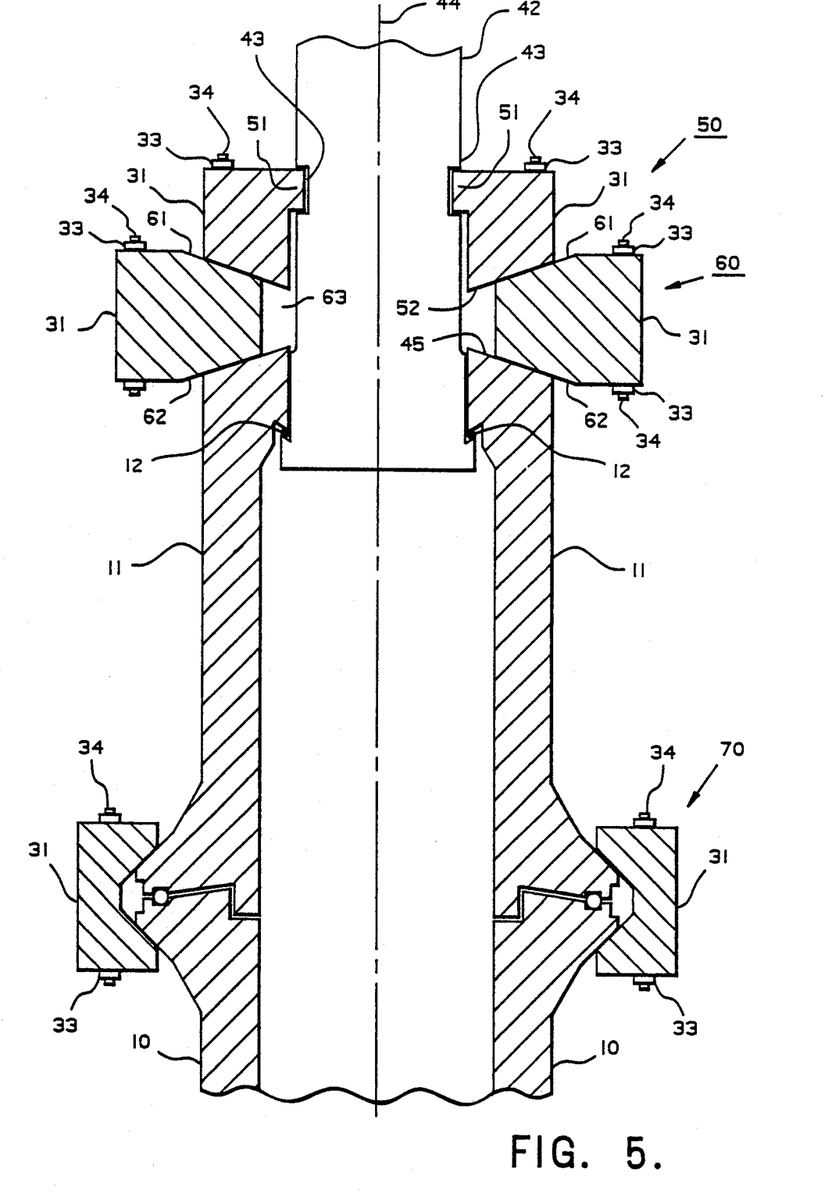
FIG. 5 is a cross sectional view of a clamping system and sealing device for a nuclear reactor instrument port interface according to one embodiment of the present invention.

Surface 45 and surface 52 cooperate to create a frusto-conical opening 63 for upper clamp 60. The inner surface of clamp 60 provides a wedge like engaging means adapted to cooperatively engage the wedge like opening 63. In particular, clamp 60 contains an upper surface 61 and a lower surface 62, each of which are also disposed at a nonperpendicular angle with respect to axis 44. It is preferred that surface 62 be in engagement with and generally parallel to surface 45 and that surface 61 be parallel to and in engagement with surface 52, as shown in FIG. 5. Both surfaces 61 and 62 slope towards the axial center of opening 63 as the radial distance from axis 44 decreases, thus creating a frusto-conical body. Due in part to the articulated nature of clamp 60 (see FIG. 7a), the internal diameter of clamp 60 decreases as ends 81A and 81D are drawn together. Due to the relationship between the axial and radial distances of the surfaces described above, a reduction in the internal diameter of the clamp 60 will exert an upward axially pressure on conduit seal 42 with respect to male flange 11.

It will be appreciated by those skilled in the art that various modifications of the clamping system shown in FIG. 5 are possible and may be desirable. It may be desirable in some applications to eliminate positioner 50 entirely and simply form conduit seal 42 with the appropriate outer configuration. It should also be noted, however, that in many situations and in nuclear power systems in particular, it is not economically practical to replace or redesign conduit seal 42 and hence in those applications the provision of a clamp such as 50 is desirable. Alternatively, positioner 50 and wedge-shape clamp 60 may be combined into a single clamp having an inner surface similar to the combination of the clamp/positioner arrangement. It will also be appreciated by those skilled in the art that while the clamping system shown in FIG. 5 provides sloping surfaces 45, 52, 61 and 62, the provision of any two of these mating surfaces will generally be sufficient to achieve the objects of the clamping and sealing system disclosed herein.

Figure 6A:
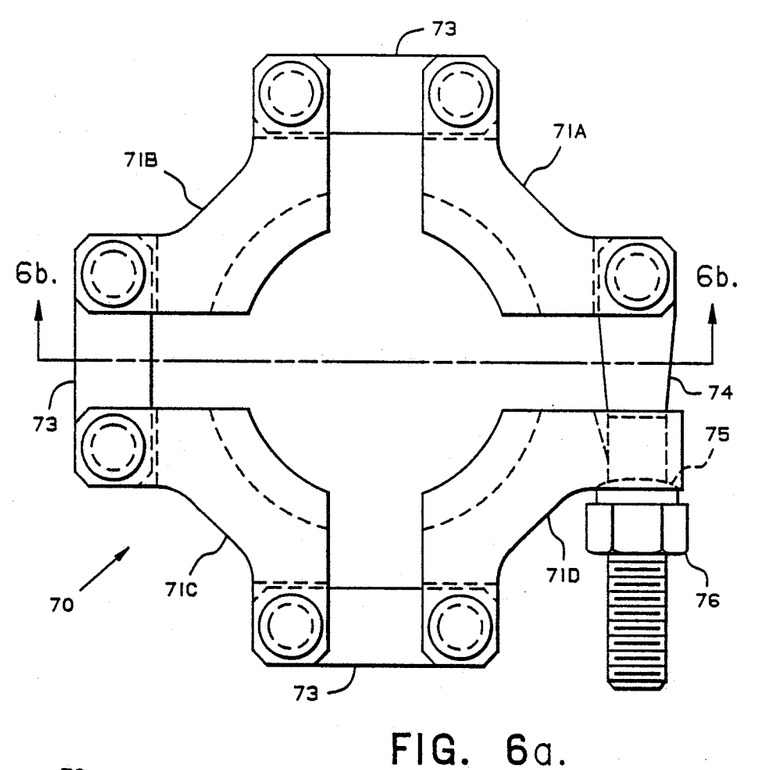
FIG. 6a is a plan view from above of a preferred lower clamping apparatus used in connection with the clamping system shown in FIG. 5.
Figure 6B:
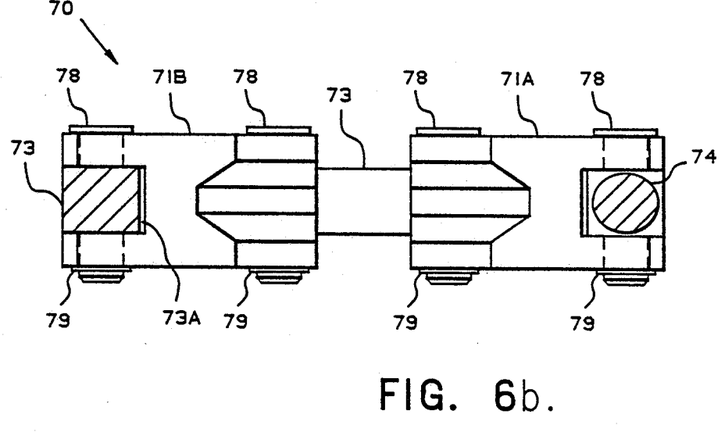

The preferred construction of the lower clamp 70 will now be described with reference to FIGS. 6a and 6b. While the clamp 70 utilizes an articulated construction as generally described above with respect to the embodiment of FIG. 3, the preferred clamping system according to this embodiment utilizes a single link between adjacent body members and an eyebolt arrangement connecting the ends of the clamp. In particular, the clamping apparatus comprises body members 71A, 71B, 71C and 71D. The pins 78 are held to clamp 70 by retaining washers 79. Intermediate body members 71B and 71C are connected to each other and to end body members 71A and 71B by a single link 73. The ends of each link are contained in a recess 73A in the ends of the body members 71A, 71B, 71C, and 71D. The link plates 73 are pivotally maintained within these recesses by pins 78 which pass through concentric apertures in the ends of the body members and the ends of the link. In this way, the intermediate and end members are joined in articulated fashion. The ends of body members 71A and 71D which are not joined by links are removably joined to one another by eyebolt 74. One end of eyebolt 74 is pivotally joined to body member 71A in a manner similar to that described above for the joining of the links and the body members. The body member 71D contains a recess into which eyebolt 74 may be easily moved. The recess in body member 71D contains a spherical cut out 75. A nut 76 having a spherical protuberance adapted to match the spherical cut out is threaded onto eyebolt 74 thereby allowing nut 76 to be moved axially along eyebolt 74. In this way the ends of body members 71A and 71D which are not joined to intermediate body members 71B and 71C may be easily separated and rejoined by eyebolt 74. Moreover, adjustment of nut 76 along eyebolt 74 will produce a change in the axial pressure exerted on the interface between the male flange 11 and female flange 10 when clamp 70 is assembled therearound. In this way, the desired compressive force can be precisely exerted on the interface.

Figure 7A:
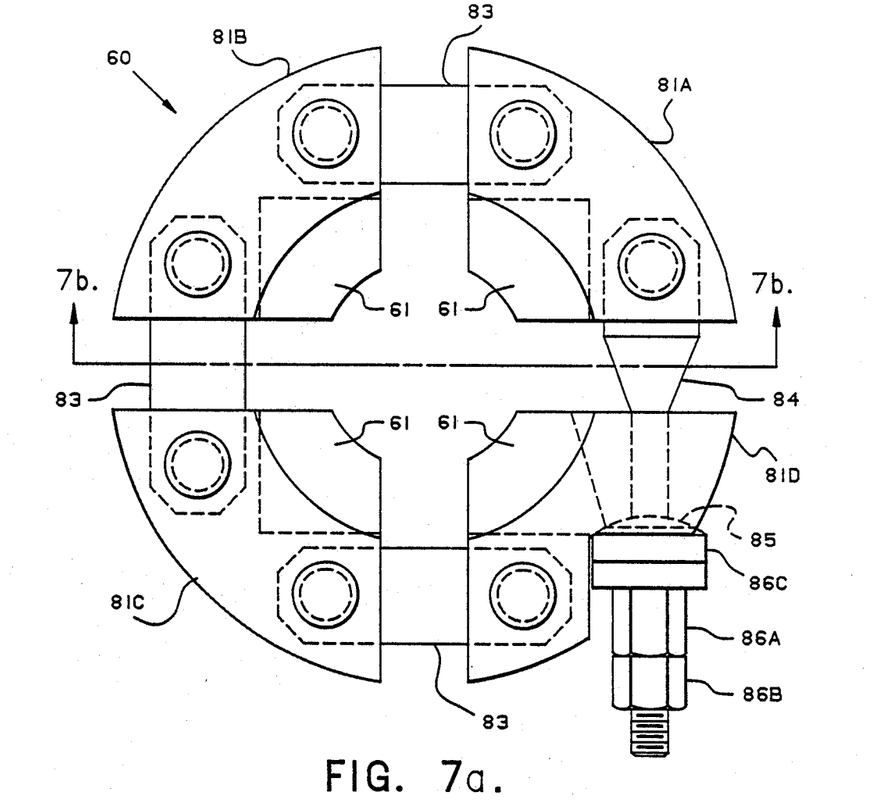
FIG. 7a is a plan view from above of the preferred upper clamping apparatus used in connection with the clamping system shown in FIG. 5.
Figure 7B:
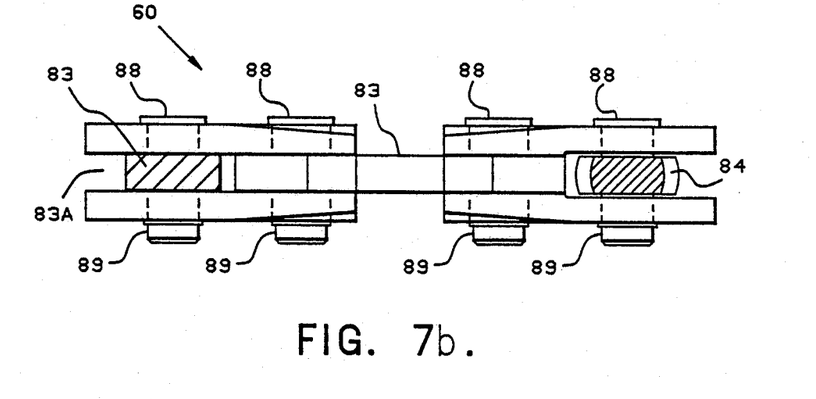

The preferred construction of wedge shape clamp 60 will now be described with reference to FIGS. 7a and 7b. While the clamp 60 utilizes an articulated construction as generally described above with respect to the embodiment of FIG. 3, the preferred clamping systems according to this embodiment utilizes a single link between adjacent body members and an eyebolt arrangement connecting the end of a clamp in a manner similar to that described for clamp 70. In particular, the clamping apparatus 60 comprises body members 81A, 81B, 81C, and 81D. Intermediate body members 81B and 81C are connected to each other and to end body members 81A and 81B by a link plates 83. The ends of each link 83 are contained in a recess 83A in the ends of the body members 81A, 81B, 81C and 81D. The links 83 are pivotally maintained within these recesses by pins 88 which pass through concentric apertures in the ends of the body members and the ends of the links. The pins 88 are held to clamp 70 by retaining washer 89. In this way, intermediate and end body members are joined in articulated fashion. The ends of body members 81A and 81D which are not joined by links 83 are removably joined to one another by an eyebolt 84. One end of eyebolt 84 is pivotally joined to body member 81A in a manner similar to that described above for joining of links and the body members. The body member 81D contains a recess in which eyebolt 84 may be easily moved. The recess in body member 81D also contains a spherical cut out 85. A washer 86C having a spherical protuberance on one side thereof is contained on eyebolt 84 for axial movement therealong. The spherical protuberance on washer 86C is adapted for engagement with the spherical cut out 85. A nut 86A is threadedly mounted to eyebolt 84 and engages washer 86C, thereby allowing nut 86A to move washer 86C axially along eyebolt 84. A locking nut 86B is also provided for nut 86A. Of course, it will be understood that the nut/washer arrangement may be substituted with a spherical nut as described with respect to the lower clamp, and vice-versa. In this way, the ends of body members 81A and 81D which are not joined to intermediate body member 81B and 81C may be easily separated and rejoined by eyebolt 84. Moreover, adjustment of nut 86A along eyebolt 84 will produce a change in the axial pressure exerted on the interface between the male flange 11 and the thermocouple column 42 when clamp 60 is assembled as described above. In this way, the desired compressive force can be precisely exerted on the interface.

As indicated by the foregoing description, the clamping apparatus and systems of the present invention will quickly and reliably seal instrument port interfaces, thus reducing the exposure of nuclear power plant workers to hazardous conditions while maintaining a high degree of protection against leakage. In particular, the present invention provides clamping apparatus and systems which can be easily operated by one worker. In addition, the clamps can be quickly applied to the instrument port interface since only the nut(s) on the eyebolt need to be tightened to assembly the clamp on the interface.

It will be appreciated by those skilled in the art that the form of the invention shown and described above is presented by way of illustration only. For example, the clamping apparatus has been described with respect to use on the generally tubular conduits associated with instrument port interfaces. The present clamping apparatus, however, is adaptable to other configurations, such as square, rectangular or triangular, for example. In addition, the present clamping apparatus may be used in other applications, such as shipping and/or storage casks, for example. Various other changes may be made in the shape, size, etc. without departing from the spirit and scope of the invention as set forth below in the claims.

I claim as my invention:

1. A system for sealing the interface between the tubular conduit seal and the tubular male flange of an instrument port of a nuclear reactor head comprising:
   (a) the male flange having a clamp receiving end portion comprising a frusto-conically shaped surface;
   (b) the tubular conduit seal having an annular groove on the exterior thereof;
   (c) a ring-shape positioner having an inwardly extending annular flange at least partially contained within said annular groove, and further having a clamp receiving portion comprising frusto-conically shaped surface; and
   (d) a generally ring-shape articulated clamp in engagement with said clamp receiving portions, said clamp including an inwardly extending wedge-shape portion which engages said clamp receiving portions such that adjustment of the internal radius of said clamp causes an adjustment of the axial pressure on said instrument port column.

2. The system of claim 1 wherein said clamp further comprises: two end body members, each of said end body members having a first end and a second end; means for linking said first ends such that the spacing between said second ends is adjustable; and means for releasably joining said second ends such that adjustment of the spacing between said second ends of said end body members causes adjustment of the internal radius of said clamp.

3. The system of claim 2 wherein said second ends of said clamp each have a datum surface thereon, and wherein said means for releasably joining said second ends comprises means for releasably maintaining intimate contact between said datum surfaces.

4. The system of claim 2 wherein said means for releasably joining said second ends comprises a eyebolt pivotally joined to one of said second ends and a recess in the other of said second ends for accepting said eyebolt.

5. The system of claim 2 wherein said first ends of said end body members are joined by an intermediate body portion.

6. The system claim 5 wherein said intermediate body portion comprises a plurality of intermediate body members joined together.

7. The system of claim 6 wherein said intermediate body portion includes links pivotally joining said intermediate body members.

8. The system of claim 7 wherein a single link plate joins intermediate body members.

9. A system for sealing the interface between a first generally tubular body and a second generally tubular body joined in a telescoping arrangement therewith, said second tubular body having an interfacing end thereof, said system comprising:
   (a) said tubular bodies each having a clamp receiving portion thereon, the clamp receiving portion of at least said second tubular body comprising a frusto-conically shaped surface which slopes away from the furthest axial extent of the interfacing end of said second tubular body as surface radius increases; and
   (b) at least one generally ring-shape clamp in engagement with said clamp receiving portions, said clamp comprising: two end body members, each of said end body members having a first end and a second end; means for linking said first ends such that the spacing between said second ends is adjustable; means for releasably joining said second ends; and means for engaging said clamp receiving portions such that adjustment of the spacing between said second ends of said end body members causes an adjustment of the axial pressure on said tubular bodies.

10. The system of claim 9 wherein said generally ring-shape clamp includes a surface which is substantially parallel to said frusto-conically shaped surface of said second tubular body, at least a portion of said surfaces being in intimate contact.

11. The system of claim 9 wherein said at least one generally ring-shape clamp comprises:
    (a) a first ring shape clamp engaging the receiving portion of said first tubular body; and
    (b) a second ring shape clamp engaging the receiving portion of said second tubular body and further engaging said first ring shape clamp such that adjustment of the spacing between the second ends of said second ring shape clamp causes an adjustment of the axial pressure on said tubular bodies.

12. The system of claim 11 wherein the clamp receiving portion of said first tubular body comprises an annular groove on the exterior of said body; and said first clamp further comprises an inwardly extending annular flange, at least a portion of said flange being contained within said annular groove.

13. The system of claim 9 wherein said means for engaging includes as least one inwardly extending annular portion of said clamp, said portion having a surface which is non perpendicular with respect to the axis of said tubular body.

14. The system of claim 13 wherein said non perpendicular surface of said clamp slopes away from the end of said second tubular body as surface radius increases.

15. The system of claim 14 wherein said non perpendicular surface of said clamp slopes away from the axial center of said inwardly extending portion as surface radius increases.

16. The system of claim 15 wherein said inwardly extending portion of said clamp further comprises a second non perpendicular surface which slopes away from the end of said second tubular body as surface radius increases.

17. The system of claim 13 wherein said inwardly extending portion comprises a wedge shape portion.

18. An improved system for sealing a thermocouple column of a nuclear reactor vessel head being of the type having a female flange mounted to the vessel head penetration, a male flange joined to the female flange, and a conduit seal joined to the male flange, the improvement comprising:
    (a) the upper end of the female flange having a clamp receiving portion comprising a frusto-conically shaped surface;
    (b) the lower end of the male flange having a clamp receiving portion comprising a frusto-conically shaped surface;

(c) a generally ring-shape articulated lower clamp in engagement with the clamp receiving portions of the lower end of the male flange and the upper end of the female flange for sealably joining the male flange to the female flange;

(d) the upper end of the male flange having a clamp receiving end portion comprising a frusto-conically shaped surface;

(e) the conduit seal having an annular groove on the exterior thereof;

(f) a ring-shaped positioner having an inwardly extending annular flange at least partially contained within said annular groove, and further having a clamp receiving portion comprising a frusto-conically shaped surface; and (g) a generally ring-shape articulated upper clamp in engagement with said clamp receiving portions of said positioner and said upper end of the male flange, said clamp including an inwardly extending wedge-shape portion which engages said clamp receiving portions.

* * * * *